United States Patent
Cho et al.

(10) Patent No.: US 11,904,752 B2
(45) Date of Patent: Feb. 20, 2024

(54) HANDLE DEVICE FOR EMBARKING AND DISEMBARKING VEHICLE

(71) Applicants: Hyundai Motor Company, Seoul (KR); Kia Corporation, Seoul (KR); NVH Korea, INC., Ulsan (KR)

(72) Inventors: Min Ho Cho, Gyeonggi-do (KR); Ji Ah Kim, Seoul (KR); Jin Ho Hwang, Chungcheongnam-do (KR); Ha Ryung Park, Gyeonggi-do (KR)

(73) Assignees: Hyundai Motor Company, Seoul (KR); Kia Corporation, Seoul (KR); NVH Korea, Inc., Ulsan (KR)

( * ) Notice: Subject to any disclaimer, the term of this patent is extended or adjusted under 35 U.S.C. 154(b) by 0 days.

(21) Appl. No.: 17/891,432

(22) Filed: Aug. 19, 2022

(65) Prior Publication Data

US 2023/0061957 A1    Mar. 2, 2023

(30) Foreign Application Priority Data

Aug. 30, 2021    (KR) .......................... 10-2021-0114358

(51) Int. Cl.
*B60N 3/02*    (2006.01)
(52) U.S. Cl.
CPC ................. *B60N 3/023* (2013.01)
(58) Field of Classification Search
CPC ............................... B60N 3/023; B60Q 3/267
USPC ........................................................ 296/1.02
See application file for complete search history.

(56) References Cited

U.S. PATENT DOCUMENTS

| | | | |
|---|---|---|---|
| 7,594,684 B2* | 9/2009 | Hidaka | B60N 3/023 16/110.1 |
| 7,905,530 B2* | 3/2011 | Browne | B60N 3/023 296/1.02 |
| 9,249,608 B2* | 2/2016 | Lang | E05B 85/103 |
| 9,340,152 B2* | 5/2016 | Salter | B60Q 3/217 |
| 11,351,901 B1* | 6/2022 | Kozu | B60N 3/023 |
| 11,518,302 B2* | 12/2022 | Cho | B60N 3/023 |
| 2009/0108607 A1* | 4/2009 | Browne | B60N 3/023 296/1.02 |
| 2018/0099610 A1* | 4/2018 | Meyers | F21V 19/003 |

* cited by examiner

*Primary Examiner* — Jason S Morrow
(74) *Attorney, Agent, or Firm* — Fox Rothschild LLP (57) ABSTRACT

A cover unit is disposed on both sides of a mounting plate that is coupled to a roof side of a vehicle, respectively. The cover unit includes a first movement guide and a second movement guide formed with movement paths and a guide frame unit that is disposed on the cover unit, respectively, and connected to each other, and sliding and moving along a guide rail provided on the mounting plate. AN angle adjustment unit has a mounting angle that is adjusted as the guide frame unit slides and moves and is coupled to be engaged with the guide frame unit. A handle unit is rotatably coupled to the guide frame unit, and has a drawn-out location and a drawn-out angle that is adjusted step by step by moving along the movement path to allow the angle adjustment unit to be selectively engaged with the guide frame unit.

15 Claims, 11 Drawing Sheets

HANDLE DEVICE FOR EMBARKING AND DISEMBARKING VEHICLE

CROSS-REFERENCE TO RELATED APPLICATION

This application claims under 35 U.S.C. § 119(a) the benefit of priority to Korean Patent Application No. 10-2021-0114358 filed on Aug. 30, 2021, the entire contents of which are incorporated herein by reference.

BACKGROUND

(a) Technical Field

The present disclosure relates to a handle device for embarking and disembarking a vehicle, and more specifically, to a handle device for embarking and disembarking a vehicle, able to be gripped by selectively moving downward from a side surface of a roof of a vehicle interior toward an inlet of an opened door as the door for the vehicle is opened, thereby assisting the elderly or disabled passengers to embark and disembark the vehicle.

(b) Background Art

Generally, a vehicle interior is provided with a plurality of auxiliary handles on upper ends of both sides thereof such that an occupant can grip them, and the auxiliary handle is located on the vehicle interior side, that is, on a lower side of a headliner and connected and fixed to a body panel for the vehicle.

The auxiliary handle may be used for boarding or embarking when installed in the vehicle, such as a van, and recently, as a vehicle having a structure with a B pillar deleted therefrom is released, the role of the auxiliary handle is becoming important as a device for assisting the boarding or embarking of the passenger, such as the elderly or the disabled, as well as the occupant. In other words, the vehicle development is not currently considerate of an aging population.

In this regard, research for developing the vehicle with amenities for the elderly or the disabled are being conducted, and in particular, devices, such as a lifter for the disabled, a rotation seat, a wheelchair movement device, and a foot type direction indicator, have been researched for a welfare vehicle for the disabled. However, since they are distinguished from the device for the reduction in overall physical abilities of the elderly, the overall researches for a reduction in a character visibility, a reduction in a color distinction, inconvenience of behavior when getting on or off the vehicle, etc. are insufficient.

Therefore, research for the device such as always turning on the lighting by providing a cluster lighting device, or attaching a handle for hand grip upon embarking or disembarking the vehicle to a seatback are being actively conducted. As the result of such researches, the auxiliary handle is conventionally mounted on the side surface of the seat for the vehicle such that the elderly or the disabled are able to embark or disembark the vehicle by effectively gripping the auxiliary handle.

However, there is a problem in that since the auxiliary handle is formed on the side surface of the seat, that is, at a low location, not only is it difficult for the elderly or the disabled to grip the auxiliary handle when embarking or disembarking the vehicle, but also it is difficult for the elderly or the disabled to support their weights when standing up in a state of gripping the auxiliary handle.

The above information disclosed in this section is merely for enhancement of understanding of the background of the disclosure and accordingly it may include information that does not form the prior art that is already known in this country to a person of ordinary skill in the art.

SUMMARY

An object of the present disclosure is to provide a handle device for getting on or off a vehicle, which can draw out and fix a handle step by step from a side surface of a roof of a vehicle interior toward the inlet of a door as an angle adjustment unit rotates and moves in a state of being engaged with a frame gear when a guide frame slides and moves upward by a user's operation and at this time, a pair of guide pins move along movement guides, respectively, thereby making it easier to grip the handle and thus assisting the elderly or disabled passengers to get on or off the vehicle.

A handle device for embarking or disembarking a vehicle according to the present disclosure may include a cover unit disposed on both sides of a mounting plate coupled to a roof side of a vehicle, respectively, and provided with a first movement guide and a second movement guide formed with movement paths, a guide frame unit disposed on the cover unit, respectively, and connected to each other, and sliding and moving along a guide rail provided on the mounting plate, an angle adjustment unit having a mounting angle adjusted as the guide frame unit slides and moves and coupled to be engaged with the guide frame unit, and a handle unit rotatably coupled to the guide frame unit, and having a drawn-out location and a drawn-out angle adjusted step by step by moving along the movement path to allow the angle adjustment unit to be selectively engaged with the guide frame unit.

In particular, the handle unit may include a first guide pin and a second guide pin mounted on the first movement guide and the second movement guide and axially coupled to the angle adjustment unit and the guide frame unit, and the angle adjustment unit may be selectively engaged with a frame gear provided in the guide frame unit as the first guide pin and the second guide pin move to allow a drawn-out location and a drawn-out angle of the handle unit to be adjusted. The second movement guide may be extensively formed to protrude to the bottom of the cover unit, and the first movement guide may include a first path disposed parallel to the second movement guide and a second path bent upward from the end of the first path and disposed to be spaced apart from the second movement guide.

Further, the second path may be bent upward from the first path to be spaced apart from the second movement guide by a length corresponding to an interval between the first guide pin and the second guide pin. The handle unit may be switched into an open mode, an angle adjustment mode, and a return mode when the first guide pin and the second guide pin move along the first movement guide and the second movement guide, respectively, at their initial locations.

Additionally, the open mode is defined as a state where as the handle unit is drawn out, the second guide pin is disposed on a second end of the second movement guide and the first guide pin is disposed on the boundary between the first path and the second path. Further, the angle adjustment mode is defined as a state where in the open mode, as the handle unit is rotated, the first guide pin enters the second path, and therefore, the angle adjustment unit may be engaged with the frame gear.

Particularly, the angle adjustment unit may be configured to move the first guide pin to the second end of the second path such that a protrusion piece moves in a state of being engaged with a plurality of gear teeth formed on the outside of the frame gear and a drawn-out angle of the handle unit is adjusted step by step. The return mode is defined as a state where in the angle adjustment mode, as the handle unit is rotated, the first guide pin moves to the second end of the second path and therefore, the angle adjustment unit is disengaged from the frame gear.

Meanwhile, the guide frame unit may include a main body axially coupled to the second guide pins that face each other, a coupling member provided with the frame gear, and accommodating the angle adjustment unit axially coupled to the first guide pin therein, and a lifting guide member mounted on the main body, gear-coupled to the guide rail, and rotated as the handle unit is drawn out to guide the sliding movement of the main body.

The guide frame unit may further include an elastic member connected to the angle adjustment unit, and configured to provide an elastic restoring force when the angle adjustment unit returns to an initial location as the angle adjustment unit is switched into a defined return mode. The guide frame unit may further include a damper member coupled to be engaged with the lifting guide member, and rotating in a direction opposite to the lifting guide member to adjust a movement speed of the main body when the main body slides and moves along the guide rail.

Meanwhile, the handle unit may include a pair of connection members disposed inside the cover unit and a grip member connecting the connection members to each other, and protruding to the bottom of the mounting plate to be selectively gripped. In particular, the grip member may include an LED light source installed in a mounting region provided therein, and emitting light and a transmissive lens configured to transmit the light emitted by the LED light source to be exposed to the outside. Further, the LED light source may be formed as any one of a lighting lamp having different colors or an UV germicidal lamp.

According to the present disclosure, it may be possible to draw out and fix a handle step by step from a side surface of a roof of a vehicle interior toward the inlet of a door as an angle adjustment unit rotates and moves in a state of being engaged with a frame gear when a guide frame slides and moves down by a user's operation and at this time, a pair of guide pins move along movement guides, respectively, thereby making it easier to grip the handle and thus assisting the elderly or disabled passengers to embark or disembark the vehicle.

Further, according to the present disclosure, the handle device for embarking or disembarking the vehicle may allow the angle adjustment unit to follow the plurality of gear teeth formed on the frame gear and selectively move upon rotation of the angle adjustment unit engaged with the frame gear to switch the location of the handle, thereby being used for the passengers embarking or disembarking the vehicle and enabling the occupants to grip the handle. Further, according to the present disclosure, it may be possible to insert the lighting source into the grip unit constituting the handle, and to enable the light of the lighting source to be transmitted to the outside through the lens of the grip unit, thereby using the handle to selectively serve as the welcome lighting, the mood lighting, and the UV germicidal lighting by the user's operation.

It is understood that the term "automotive" or "vehicular" or other similar term as used herein is inclusive of motor automobiles in general such as passenger automobiles including sports utility automobiles (operation SUV), buses, trucks, various commercial automobiles, watercraft including a variety of boats and ships, aircraft, and the like, and includes hybrid automobiles, electric automobiles, plug-in hybrid electric automobiles, hydrogen-powered automobiles and other alternative fuel automobiles (e.g., fuels derived from resources other than petroleum). As referred to herein, a hybrid automotive is an automotive that has two or more sources of power, for example both gasoline-powered and electric-powered automobiles.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, an exemplary embodiment of the present disclosure will be described in detail with reference to the accompanying drawings.

Advantages and features of the present disclosure, and a method for achieving them will become apparent with reference to the embodiments described below in detail in conjunction with the accompanying drawings.

However, the present disclosure is not limited to the embodiments disclosed below but may be implemented in various different forms, and only the present embodiments serve to complete the disclosure of the present disclosure, and to fully inform those skilled in the art to which the present disclosure pertains of the scope of the disclosure, and the present disclosure is only defined by the scope of the claims. Further, in the description of the present disclosure, if it is determined that related known techniques can obscure the gist of the present disclosure, a detailed description thereof will be omitted.

Figure 1:
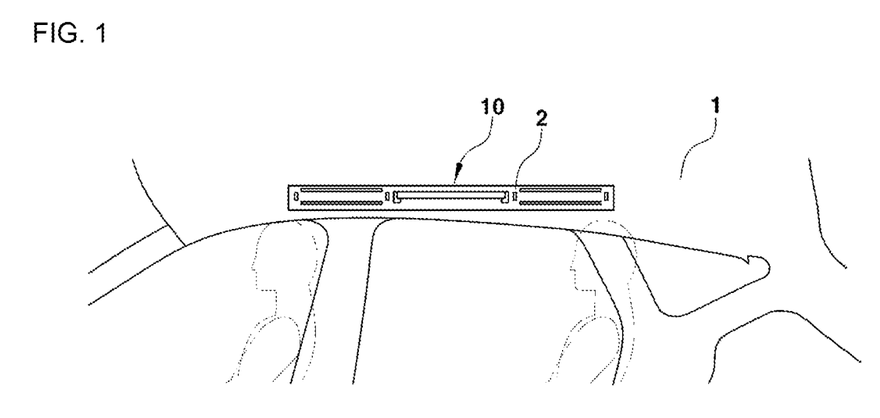
FIG. 1 is a diagram showing an installation location of a handle device for embarking or disembarking a vehicle according to an exemplary embodiment of the present disclosure.
Figure 2:
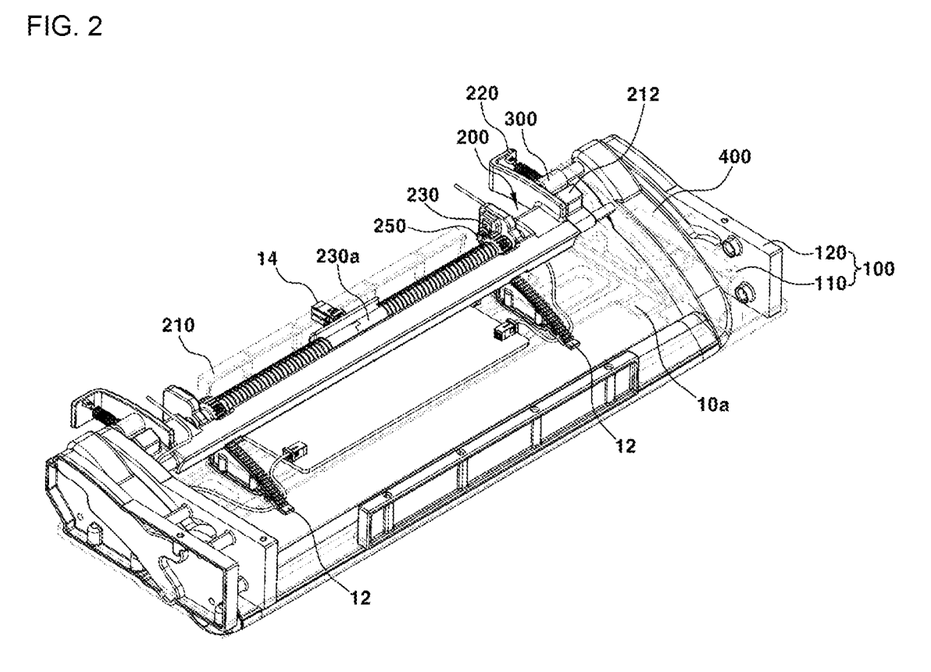
FIG. 2 is a diagram showing a structure of the handle device for embarking or disembarking the vehicle according to the exemplary embodiment of the present disclosure.
Figure 3:
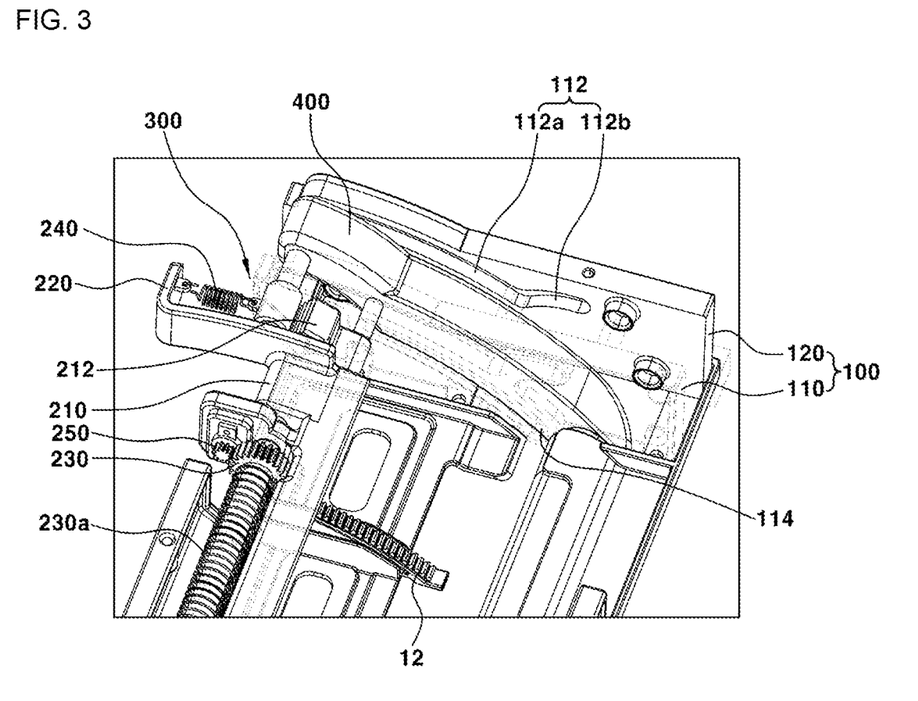
FIG. 3 is a diagram showing a structure of a guide frame unit of the handle device for embarking or disembarking the vehicle according to the exemplary embodiment of the present disclosure.

FIG. 1 is a diagram showing an installation location of a handle device for getting on or off a vehicle according to an exemplary embodiment of the present disclosure, FIG. 2 is a diagram showing a structure of the handle device for embarking or disembarking the vehicle according to the exemplary embodiment of the present disclosure, and FIG. 3 is a diagram showing a structure of a guide frame unit of the handle device for embarking or disembarking the vehicle according to the exemplary embodiment of the present disclosure.

Figure 4:
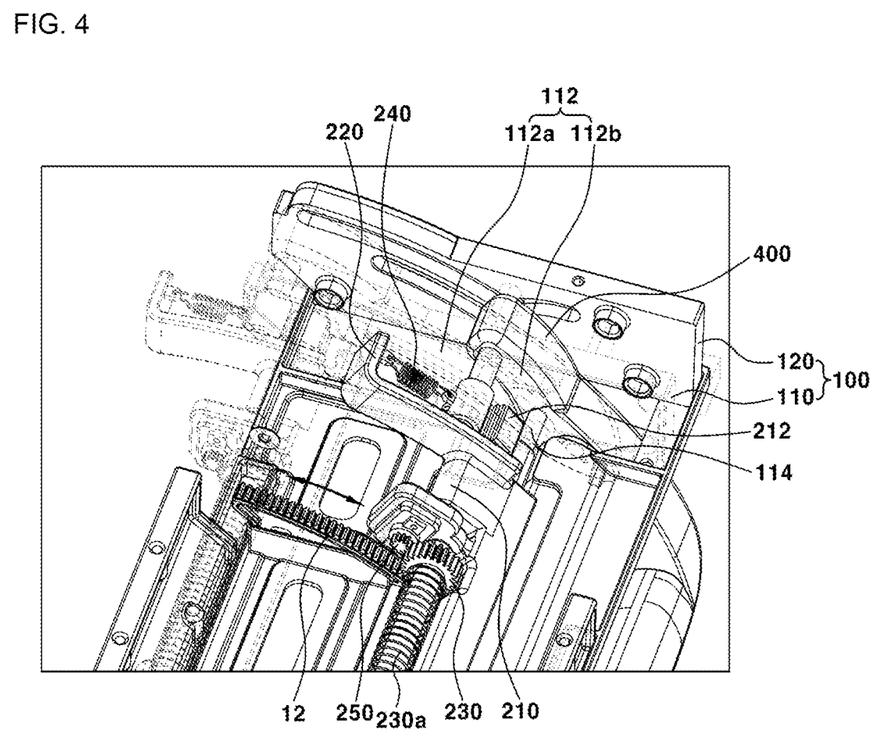
FIG. 4 is a diagram showing an operation of the guide frame unit of the handle device for embarking or disembarking the vehicle according to the exemplary embodiment of the present disclosure.
Figure 5:
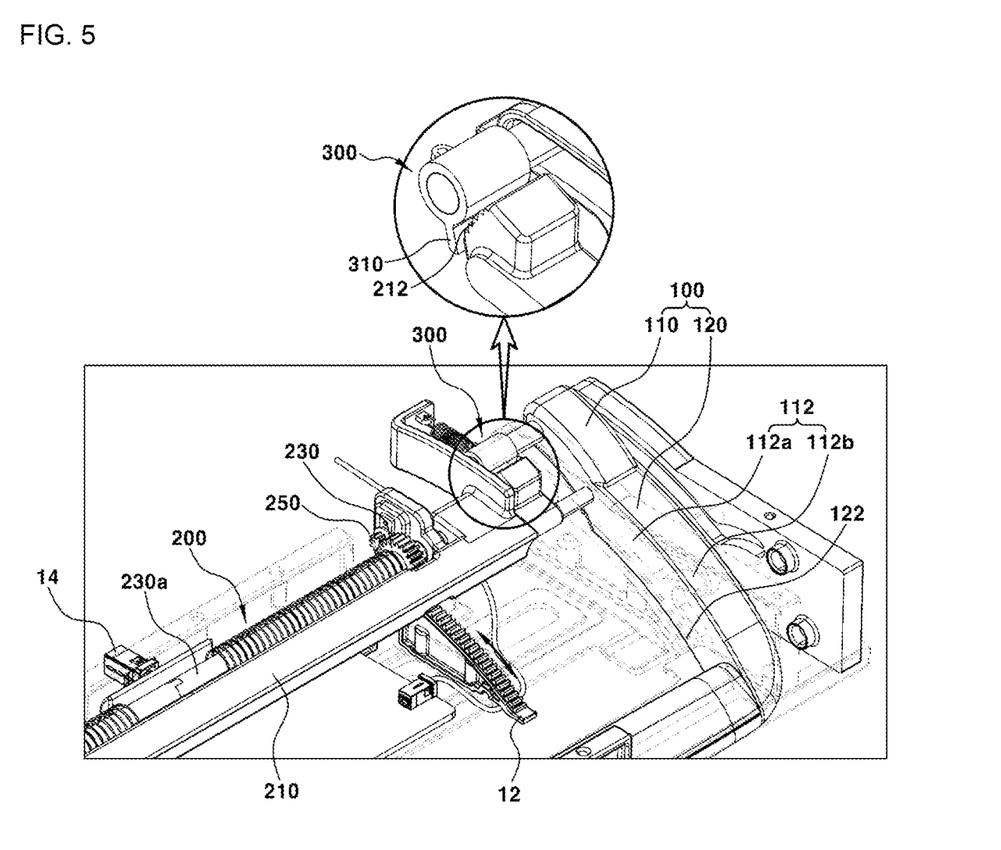
FIG. 5 is a diagram showing an angle adjustment unit and a damper member of the handle device for embarking or disembarking the vehicle according to the exemplary embodiment of the present disclosure.
Figure 6:
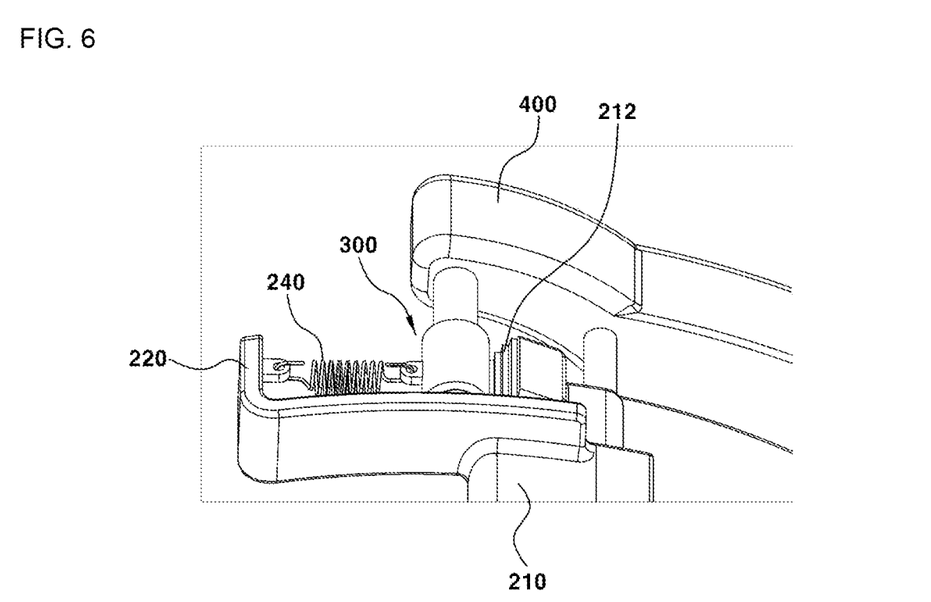
FIG. 6 is a diagram showing a structure of the angle adjustment unit of the handle device for embarking or disembarking the vehicle according to the exemplary embodiment of the present disclosure.

Further, FIG. 4 is a diagram showing an operation of the guide frame unit of the handle device for embarking or disembarking the vehicle according to the exemplary embodiment of the present disclosure, FIG. 5 is a diagram showing an angle adjustment unit and a damper member of the handle device for embarking or disembarking the vehicle according to the exemplary embodiment of the present disclosure, and FIG. 6 is a diagram showing a structure of the angle adjustment unit of the handle device for embarking or disembarking the vehicle according to the exemplary embodiment of the present disclosure.

Figure 7:
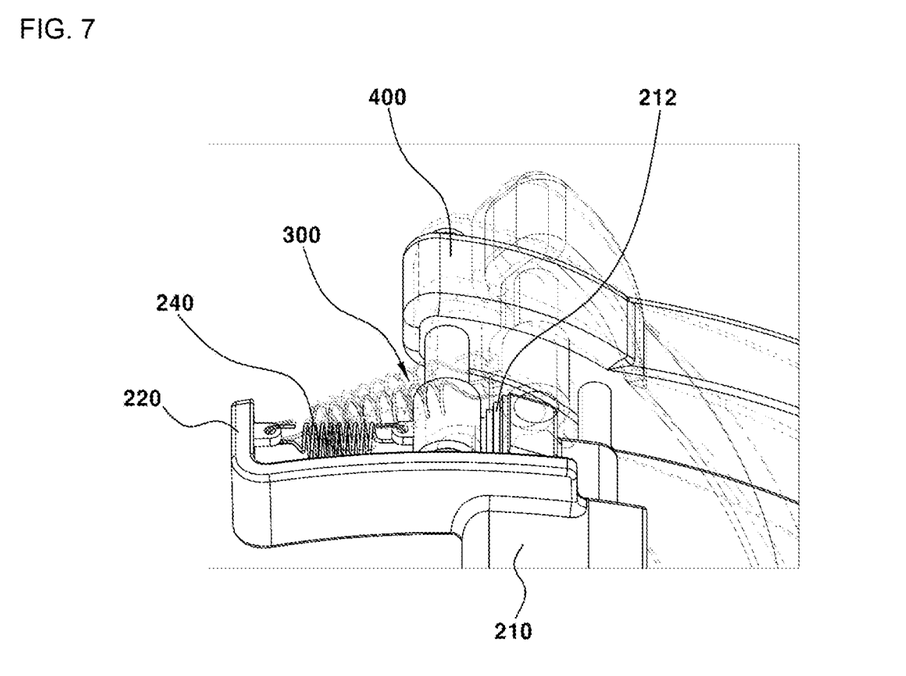
FIG. 7 is a diagram showing an operation of the angle adjustment unit of the handle device for embarking or disembarking the vehicle according to the exemplary embodiment of the present disclosure.
Figure 8:
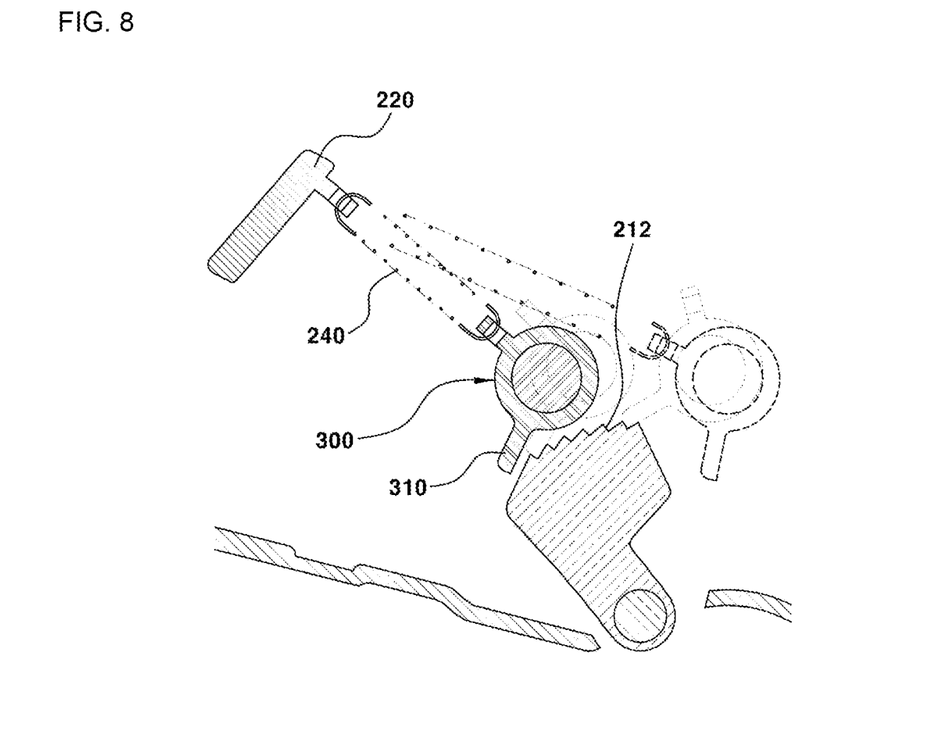
FIG. 8 is a cross-sectional diagram showing the operation of the angle adjustment unit of the handle device for embarking or disembarking the vehicle according to the exemplary embodiment of the present disclosure.

Further, FIG. 7 is a diagram showing an operation of the angle adjustment unit of the handle device for embarking or disembarking the vehicle according to the exemplary embodiment of the present disclosure and FIG. 8 is a cross-sectional diagram showing the operation of the angle adjustment unit of the handle device for embarking or disembarking the vehicle according to the exemplary embodiment of the present disclosure.

As shown in FIG. 1, a handle device 10 for embarking or disembarking a vehicle according to the present exemplary embodiment may be disposed on both sides of a roof 1, and more specifically, disposed between roof vent grills 2 installed on the roof 1 in the second row space of the vehicle.

The handle device 10 for embarking or disembarking the vehicle may be selectively drawn out toward the second row space to assist passengers to embark or disembark the vehicle. Accordingly, as shown in FIG. 2, the handle device 10 for embarking or disembarking the vehicle may include a cover unit 100, a guide frame unit 200, an angle adjustment unit 300, and a handle unit 400. A pair of cover units 100 may be disposed on both sides of a mounting plate 10a for being coupled between the roof vent grills 2 in the second row space of the vehicle, respectively, to face each other.

More preferably, the cover unit 100 may be formed in a structure in which a first cover unit 110 disposed inside and a second cover unit 120 disposed outside are coupled. The first cover unit 110 may include a first movement guide 112 extending at a predetermined length to form a movement path. The second cover unit 120 may be coupled to the outside of the first cover unit 110 at the same size as that of the first cover unit 110, provided with a movement path facing the first movement guide 112, and provided with a second movement guide 122 disposed adjacent to the movement path. In particular, the second movement guide 122 may have a structure of having a predetermined slope and extending to the bottom of the second cover unit 120 to protrude.

The guide frame unit 200 may be disposed between the pair of cover units 100 facing each other inside the mounting plate 10a, and as shown in FIG. 3, reciprocally slides and moves along a guide rail 12 formed to be inclined downward in the movement direction of the guide frame unit 200. The guide frame unit 200 may include a main body 210, a coupling member 220, and a lifting guide member 230.

The main body 210 may be axially coupled to the handle units 400 disposed on the first cover unit 110 and the second cover unit 120 to face each other. In particular, the handle units 400 may include a first guide pin 402 and a second guide pin 404 that are mounted on the first movement guide 112 and the second movement guide 122 to be axially coupled to the angle adjustment unit 300 and the guide frame unit 200, respectively, in which the main body 210 is axially coupled to the second guide pin 404.

Further, the coupling member 220 may include a pair of frame gears 212, and accommodates the angle adjustment unit 300 axially coupled to the first guide pin 402 therein (see FIG. 3). The lifting guide members 230 may be mounted on both sides of a rotary shaft 230a coupled to the center of the main body 210, respectively, and gear-coupled to the guide rails 12, and as shown in FIG. 4, guide the sliding movement of the main body 210 by being rotated as the handle unit 400 is drawn out.

As shown in FIGS. 6 and 7, the guide frame 200 may further include an elastic member 240. The elastic member 240 may be connected to the angle adjustment unit 300 inside the coupling member 220, and may provide an elastic restoring force to the angle adjustment unit 300 when the angle adjustment unit 300 returns to the initial location as the angle adjustment unit 300 is switched into a defined return mode.

In other words, as the handle unit 400 rotates, the angle adjustment unit 300 also rotates together to be switched from an open mode into an angle adjustment mode (see FIG.

8), and at this time, when the angle adjustment unit 300 is switched from the angle adjustment mode to the return mode by additionally rotating the handle unit 400, the angle adjustment unit 300 may effectively return to the initial location by delivering an elastic restoring force generated by the elastic member 240 to the angle adjustment unit 300 to rotate the angle adjustment unit 300.

Further, as shown in FIG. 3, the guide frame unit 200 may further include a damper member 250. The damper member 250 may be coupled to be engaged with the lifting guide member 230, and may rotate in a direction opposite to the lifting guide member 230 to adjust a sliding movement speed of the main body 210 when the main body 210 moves along the guide rail 12. In other words, as the handle unit 400 is drawn out, as shown in FIG. 4, when the main body 210 slides and moves along the guide rail 12, the main body 210 may rapidly move downward by the slope of the guide rail 12, and at this time, the damper member 250 may rotate in the direction opposite to the lifting guide member 230 to provide a resistance force, thereby preventing the main body 210 from sliding and moving (moving downward) at high speed in advance.

Meanwhile, a mounting angle of the angle adjustment unit 300 may be adjusted as the guide frame unit 200 slides and moves and coupled to be selectively engaged with the guide frame unit 200. More specifically, as the first guide pin 402 and the second guide pin 404 move, the angle adjustment unit 300 may be selectively engaged with the frame gear 212 provided in the guide frame unit 200 such that the drawn-out location and drawn-out angle of the handle unit 400 can be adjusted.

If the handle unit 400 is drawn out, the first guide pin 402 and the second guide pin 404 may be rotatably coupled to the angle adjustment unit 300 and the main body 210, respectively, and therefore, as shown in FIG. 4, the main body 210 also slides and moves (moves downward). At this time, since a protrusion piece 310 is formed to protrude from the angle adjustment unit 300, the protrusion piece 310 may be coupled to be engaged with the frame gear 212 when rotating the drawn-out handle unit 400 (see an enlarged diagram of FIG. 5).

In particular, since the protrusion piece 310 is engaged with the gear teeth of the frame gear 212, the drawn-out angle of the drawn-out handle unit 400 may be adjusted, and preferably, as shown in FIG. 8, the drawn-out angle of the handle unit 400 may be adjusted in four steps. The adjustment of the drawn-out angle of the handle unit 400 in four steps merely corresponds to any one exemplary embodiment and is not determined, and the drawn-out angle may also be adjusted to be subdivided by increasing or decreasing the number of gear teeth formed on the frame gear 212.

Therefore, according to the present exemplary embodiment, the angle at which the handle unit 400 is drawn out by the user's operation may be changed step by step by adjusting the drawn-out angle of the handle unit 400, thereby providing the use convenience and making it easier to grip the handle. As a result, according to the present exemplary embodiment, it may be possible to assist the elderly or disabled passengers to embark or disembark the vehicle conveniently using the drawn-out handle unit 400.

Figure 9A:
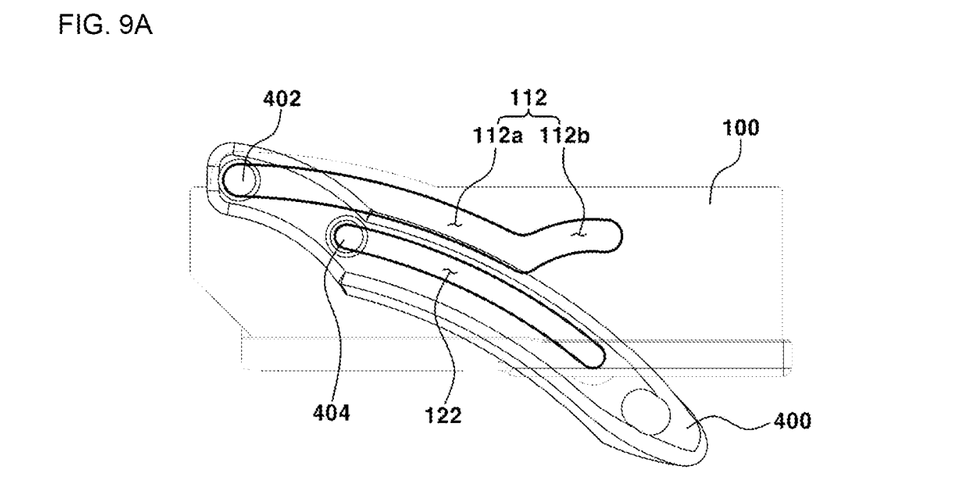
FIGS. 9A and 9B are diagrams showing a base mode of the handle device for embarking or disembarking the vehicle according to the exemplary embodiment of the present disclosure.
Figure 9B:
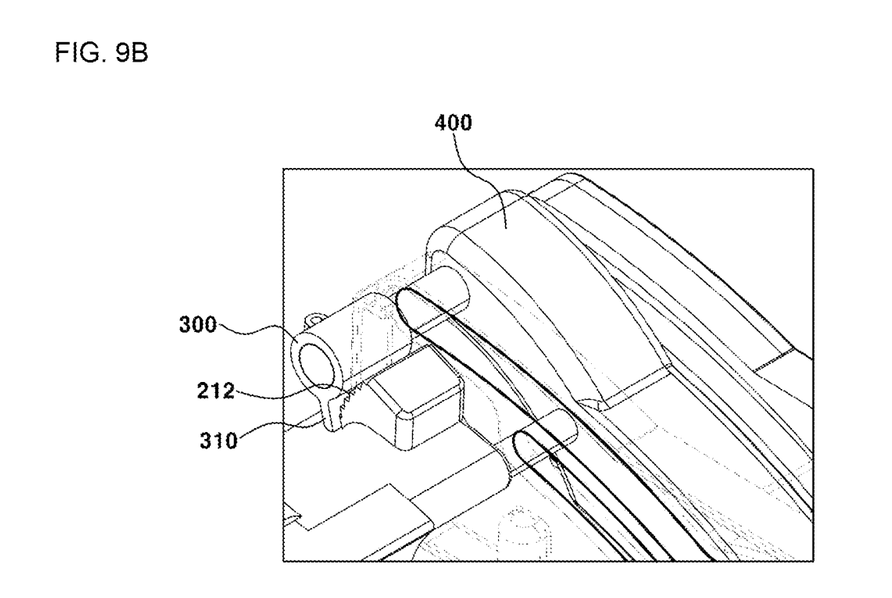
Figure 10A:
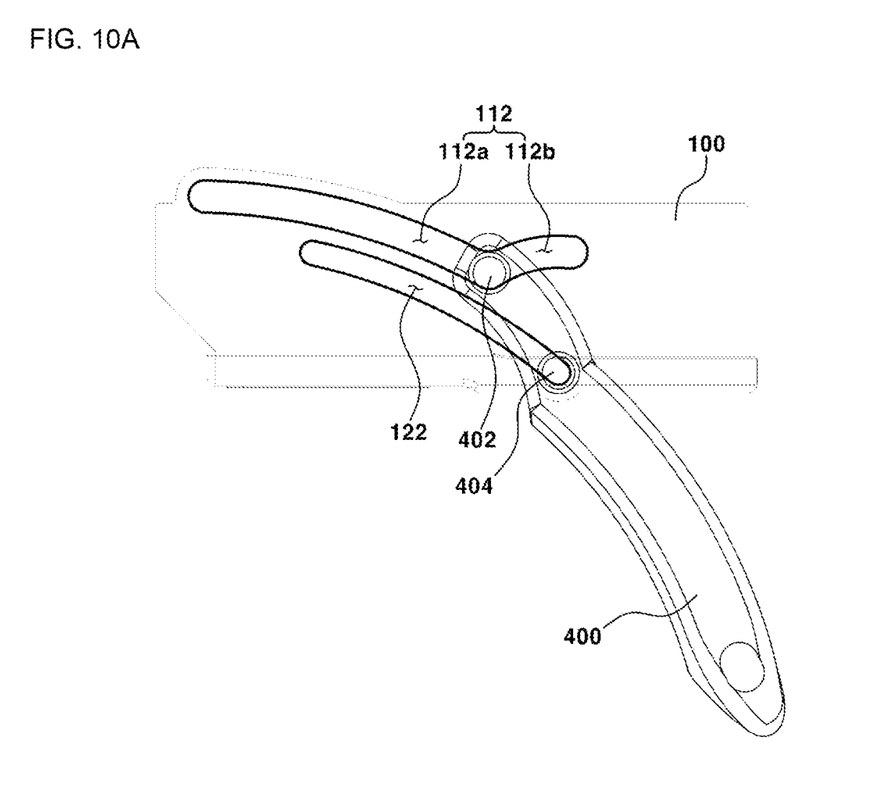
FIGS. 10A and 10B are diagrams showing an open mode of the handle device for embarking or disembarking the vehicle according to the exemplary embodiment of the present disclosure.
Figure 10B:
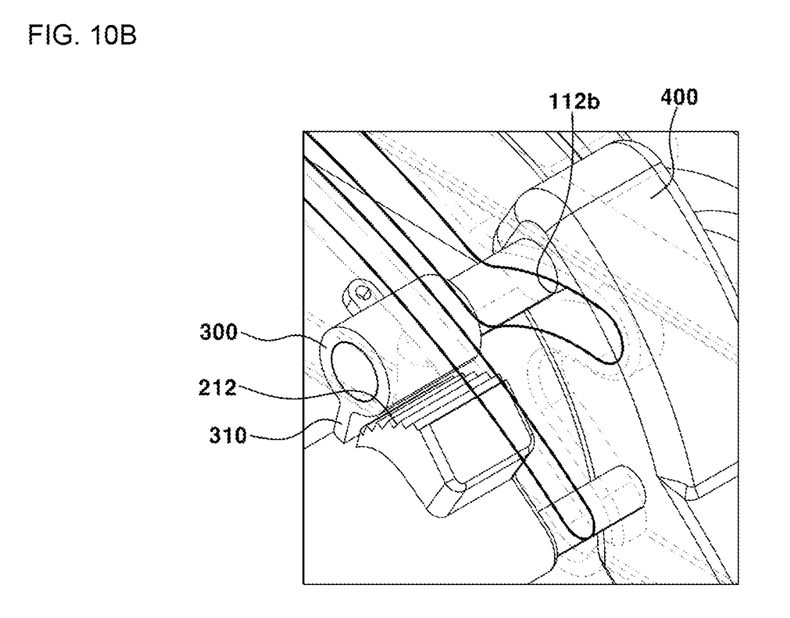
Figure 11A:
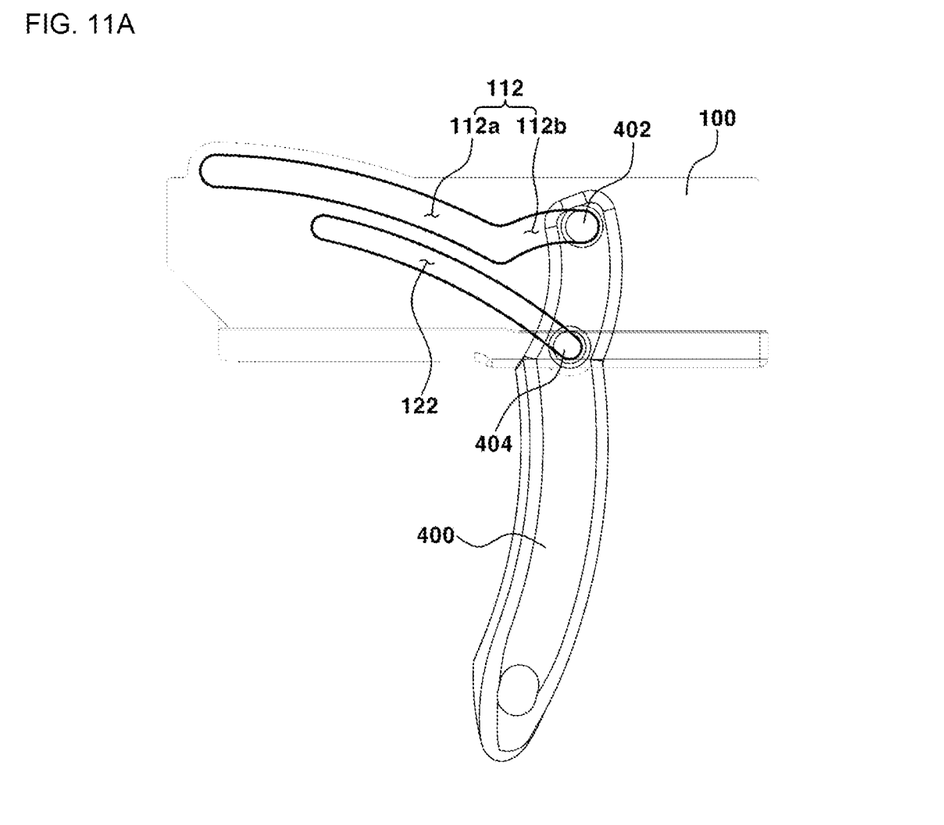
FIGS. 11A and 11B are diagrams showing an angle adjustment mode of the handle device for embarking or disembarking the vehicle according to the exemplary embodiment of the present disclosure.
Figure 11B:
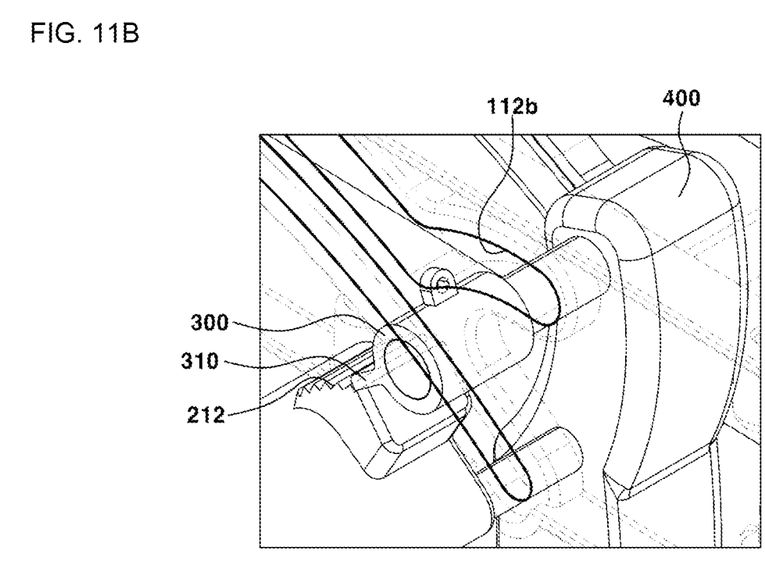

Hereinafter, FIGS. 9A and 9B are diagrams showing a base mode of the handle device for embarking or disembarking the vehicle according to the exemplary embodiment of the present disclosure, FIGS. 10A and 10B are diagrams showing an open mode of the handle device for embarking or disembarking the vehicle according to the exemplary embodiment of the present disclosure, and FIGS. 11A and 11B are diagrams showing an angle adjustment mode of the handle device for embarking or disembarking the vehicle according to the exemplary embodiment of the present disclosure.

In the handle device 10 for embarking or disembarking the vehicle according to the present exemplary embodiment, as the handle unit 400 is drawn out, the guide frame unit 200 slides and moves, and therefore the handle unit 400 may be sequentially switched into the open mode, the angle adjustment mode, and the return mode.

Open Mode

Before describing the open mode, the second movement guide 122 is extensively formed to protrude to the bottom of the second cover unit 120, and the first movement guide 112 may include a first path 112a disposed parallel to the second movement guide 122 of the second cover unit 120 and a second path 112b bent upward from the end of the first path 112a and disposed to be vertically spaced apart from the second movement guide 122 protruding to the bottom of the second cover unit 120. More preferably, the second path 112b may be bent upward from the first path 112a at a predetermined angle such that the end of the second path 112b is spaced apart from the end of the second movement guide 122 by a length corresponding to an interval between the first guide pin 402 and the second guide pin 404.

As shown in FIGS. 10A and 10B, the open mode may be defined as a state where the first guide pin 402 is located at the boundary between the first path 112a and the second path 112b, that is, located in the bent region of the first movement guide 112, and the second guide pin 404 is also located on the second end (opposite end) of the second movement guide 122. As described above, since the first guide pin 402 and the second guide pin 404 move while maintaining the same interval, in a state where the guide frame unit 200 is fixed to a fixing member 14, when the guide frame unit 200 is released from the fixing to the fixing member 14 to slide and move (move downward) as the handle unit 400 is drawn out, the second guide pin 404 is disposed in front of the first guide pin 402 in the base mode shown in FIGS. 9A and 9B, and therefore, first latched to and located on the second end of the second movement guide 122.

Therefore, when the second guide pin 404 is latched to and located on the second end of the second movement guide 122, the first guide pin 402 is located on the boundary between the first path 112a and the second path 112b. As a result, the open mode may be defined as a state where the guide frame unit 200 slides and moves (moves downward) along the guide rail 12 by forcibly drawing out the handle unit 400 to the bottom of the mounting plate 10a toward the outdoor side of the vehicle in the base mode, and therefore, the first guide pin 402 and the second guide pin 404 are located at the boundary between the first path 112a and the second path 112b and on the other end of the second movement guide 122, respectively.

In other words, the open mode corresponds to a mode in which the first guide pin 402 and the second guide pin 404 move along the first movement guide 112 and the second movement guide 122, respectively, by the sliding movement of the guide frame unit 200 in the open mode to protrude toward the outdoor side of the vehicle as the handle unit 400 is forcibly drawn out, and may be defined as the location that provides the role of the handle to the occupant. As described above, the handle unit 400 may protrude from the vehicle interior toward the exterior side thereof, that is, protrude not to cause interference on the interior side as much as possible, thereby preventing the head portion of the occupant from colliding with the handle unit 400 in advance as well as serving as the occupant's handle.

Angle Adjustment Mode

The angle adjustment mode may be defined as a state where the angle adjustment unit 300 is engaged with the frame gear 212 when the first guide pin 402 enters the second path 112*b* by additionally rotating the handle unit 400 in the state where the second guide pin 404 is located on the second end of the second movement guide 122 in the open mode. In other words, as shown in FIGS. 11A and 11B, the angle adjustment mode may be defined as a state where the first guide pin 402 and the second guide pin 404 are located on the second path 112*b* of the first movement guide 112 and the other end of the second movement guide 122, respectively.

In the angle adjustment mode, since the protrusion piece 310 is engaged with the gear teeth of the frame gear 212, the drawn-out angle of the handle unit 400 may be selectively adjusted by forcibly rotating the drawn-out handle unit 400. Preferably, the drawn-out angle of the handle unit 400 may be adjusted in four steps in the angle adjustment mode, but this is merely any one exemplary embodiment and is not determined, and the drawn-out angle may also be adjusted to be subdivided by increasing or decreasing the number of gear teeth formed on the frame gear 212.

As a result, the handle unit 400 protrudes from the bottom of the mounting plate 10*a* to correspond to a location close to the verticality toward the indoor side of the vehicle, and the protrusion piece 310 is engaged with the gear teeth of the frame gear 212, thereby making it possible to stably withstand the passenger's load, and enabling the passenger to more easily enter the second row of the vehicle in a state of gripping the handle unit 400.

Return Mode

Although not shown in the drawings, the return mode may be defined as a state where the first guide pin 402 moves to the second end of the second path 112*b* by additionally rotating the handle unit 400 in the angle adjustment mode and therefore, the protrusion piece 310 is disengaged from the frame gear 212.

At this time, when the protrusion piece 310 is disengaged from the frame gear 212, the angle adjustment unit 300 returns to the initial location by the elastic member 240, and in this state, may return to the base mode by pushing up the handle unit 400 to the inside by the user's operation, in which when the guide frame unit 200 is coupled to the fixing member 14, the guide frame unit 200 may be fixed in the base mode. Therefore, the first guide pin 402 sequentially moves along the second path 112*b* and the first path 112*a*, and the second guide pin 404 moves to the initial location along the second movement guide 122 to be located in the base mode again, and therefore, the handle unit 400 may be in a state of being introduced into the inside, thereby preventing the occurrence of the interference caused by the handle unit 400 in advance if the passenger gets off the vehicle.

Figure 12:
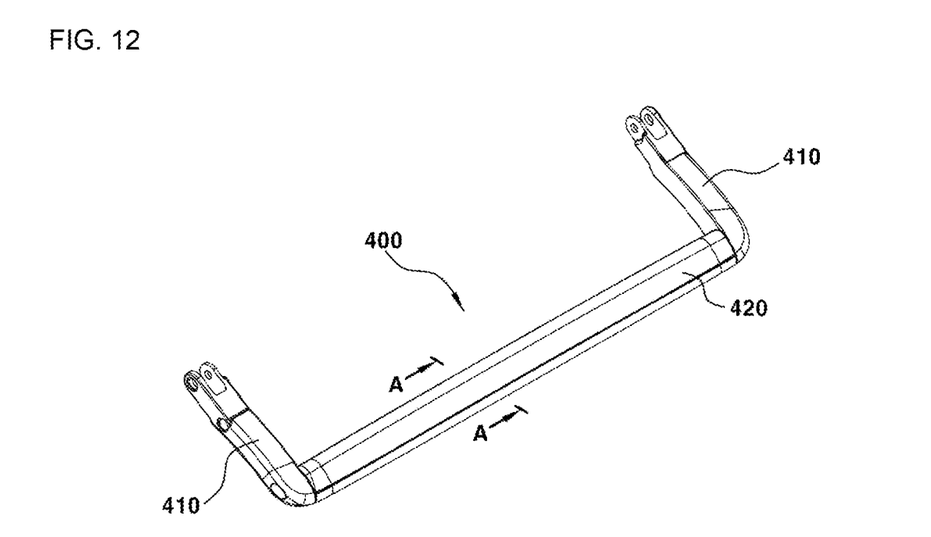
FIG. 12 is a diagram showing a grip member of a handle unit of the handle device for embarking or disembarking the vehicle according to the exemplary embodiment of the present disclosure.
Figure 13:
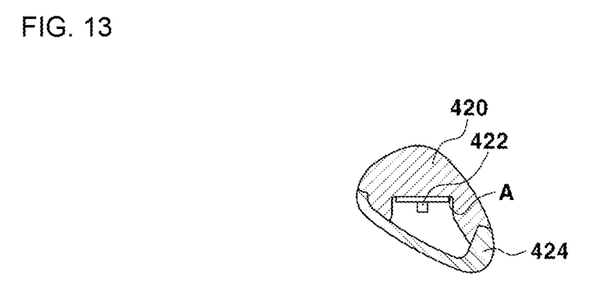
FIG. 13 is a cross-sectional diagram taken along line A-A of FIG. 12 of the handle device for embarking or disembarking the vehicle according to the exemplary embodiment of the present disclosure.

Hereinafter, FIG. 12 is a diagram showing a grip member of a handle unit of the handle device for getting on or off the vehicle according to the exemplary embodiment of the present disclosure and FIG. 13 is a cross-sectional diagram taken along line A-A of FIG. 12 of the handle device for embarking or disembarking the vehicle according to the exemplary embodiment of the present disclosure.

As shown in FIG. 12, the handle device 10 for embarking or disembarking the vehicle according to the present exemplary embodiment includes the handle unit 400 and the handle unit 400 is provided with a connection member 410 and a grip member 420. A pair of connection members 410 are formed, and provided with the first guide pin 402 and the second guide pin 404, respectively, and mounted on the cover units 100 coupled to both sides of the mounting plate 10*a*, respectively.

More specifically, the connection members 410 may be mounted between the first cover unit 110 and the second cover unit 120 on both sides of the mounting plate 10*a*. Further, the grip member 420 connects the ends of the pair of connection members 410, and is formed to enable the passenger or the occupant to grip the handle unit 400 as the handle unit 400 is located at a first location or a second location to protrude to the bottom of the mounting plate 10*a*.

As shown in FIG. 13, the grip member 420 may be provided with an LED light source 422 and a transmissive lens 424. The LED light source 422 may be installed in a mounting region A provided inside the grip member 420 and connected to a PCB of the mounting plate 10*a* to serve as the lamp, and selectively emits light as the power source is applied.

Further, the LED light source 422 may be provided as any one of a lighting lamp having different colors or an UV germicidal lamp. In other words, the LED light source 422 may be provided as the lighting lamp having the bright color such as white and used as a welcome lamp when the door is opened, and may also be provided as the lighting lamp having the yellow, etc. and used as a mood lamp when the door is closed.

Additionally, the LED light source 422 may also be provided as the UV germicidal lamp and used for sterilizing the grip member 420, and may also be used for sterilizing clothes if the grip member 420 is used as a hanger. Further, the transmissive lens 424 is mounted on the front surface of the grip member 420, and transmits the light emitted from the LED light source 422.

According to the present disclosure, it may be possible to draw out and fix a handle step by step from a side surface of a roof of a vehicle interior toward the inlet of a door as an angle adjustment unit rotates and moves in a state of being engaged with a frame gear when a guide frame slides and moves down by a user's operation and at this time, a pair of guide pins move along movement guides, respectively, thereby making it easier to grip the handle and thus assisting the elderly or disabled passengers to embark and disembark the vehicle.

Further, according to the present disclosure, the handle device for embarking or disembarking the vehicle allows the angle adjustment unit to follow the plurality of gear teeth formed on the frame gear and selectively move upon rotation of the angle adjustment unit engaged with the frame gear to switch the location of the handle, thereby being used for the passengers embarking or disembarking the vehicle and enabling the occupants to grip the handle. Additionally, according to the present disclosure, it is possible to insert the lighting source into the grip unit constituting the handle, and to enable the light of the lighting source to be transmitted to the outside through the lens of the grip unit, thereby using the handle to selectively serve as the welcome lighting, the mood lighting, and the UV germicidal lighting by the user's operation.

Although the present disclosure has been described with reference to the exemplary embodiment(s) shown in the drawings, this is merely illustrative, and it will be understood by those skilled in the art that various modifications may be made therefrom, and all or part of the aforementioned exemplary embodiment(s) can be selectively combined and constituted. Therefore, the true technical scope of the present disclosure should be determined by the technical spirit of the appended claims.

What is claimed is:

1. A handle device for embarking or disembarking a vehicle, comprising:
a pair of cover units, each cover unit respectively disposed on one of both sides of a mounting plate coupled to a roof side of the vehicle, and provided with a first movement guide and a second movement guide formed with movement paths;
a guide frame unit disposed on the cover unit, respectively, and connected to each other, and sliding and moving along a guide rail provided on the mounting plate;
an angle adjustment unit having a mounting angle adjusted as the guide frame unit slides and moves and coupled to be engaged with the guide frame unit; and
a handle unit rotatably coupled to the guide frame unit, and having a drawn-out location and a drawn-out angle adjusted step by step by moving along the movement path to allow the angle adjustment unit to be selectively engaged with the guide frame unit.

2. The handle device for embarking or disembarking the vehicle of claim 1,
wherein the handle unit includes a first guide pin and a second guide pin mounted on the first movement guide and the second movement guide and axially coupled to the angle adjustment unit and the guide frame unit, and
wherein the angle adjustment unit is selectively engaged with a frame gear provided in the guide frame unit as the first guide pin and the second guide pin move to allow a drawn-out location and a drawn-out angle of the handle unit to be adjusted.

3. The handle device for embarking or disembarking the vehicle of claim 2,
wherein the second movement guide is formed to protrude to the bottom of the cover unit, and
wherein the first movement guide includes a first path disposed parallel to the second movement guide and a second path bent upward from the end of the first path and disposed to be spaced apart from the second movement guide.

4. The handle device for embarking or disembarking the vehicle of claim 3,
wherein the second path is bent upward from the first path to be spaced apart from the second movement guide by a length corresponding to an interval between the first guide pin and the second guide pin.

5. The handle device for embarking or disembarking the vehicle of claim 3,
wherein the handle unit is switched into an open mode, an angle adjustment mode, and a return mode when the first guide pin and the second guide pin move along the first movement guide and the second movement guide, respectively, at their initial locations.

6. The handle device for embarking or disembarking the vehicle of claim 5,
wherein the open mode is defined as a state where as the handle unit is drawn out, the second guide pin is located on an opposite end of the second movement guide and the first guide pin is located on the boundary between the first path and the second path.

7. The handle device for embarking or disembarking the vehicle of claim 5,
wherein the angle adjustment mode is defined as a state where in the open mode, as the handle unit is rotated, the first guide pin enters the second path, and the angle adjustment unit is engaged with the frame gear.

8. The handle device for embarking or disembarking the vehicle of claim 7,
wherein the angle adjustment unit moves the first guide pin to an opposite end of the second path to cause a protrusion piece to move while engaged with a plurality of gear teeth formed on the outside of the frame gear and a drawn-out angle of the handle unit is adjusted step by step.

9. The handle device for embarking or disembarking the vehicle of claim 5,
wherein the return mode is defined as a state where in the angle adjustment mode, as the handle unit is rotated, the first guide pin moves to an opposite end of the second path and the angle adjustment unit is disengaged from the frame gear.

10. The handle device for embarking or disembarking the vehicle of claim 2, wherein the guide frame unit includes:
a main body axially coupled to the second guide pin;
a coupling member provided with the frame gear, and accommodating the angle adjustment unit axially coupled to the first guide pin therein; and
a lifting guide member mounted on the main body, gear-coupled to the guide rail, and rotated as the handle unit is drawn out to guide the sliding movement of the main body.

11. The handle device for embarking or disembarking the vehicle of claim 10, wherein the guide frame unit includes:
an elastic member connected to the angle adjustment unit, and configured to provide an elastic restoring force when the angle adjustment unit returns to an initial location as the angle adjustment unit is switched into a defined return mode.

12. The handle device for embarking or disembarking the vehicle of claim 10, wherein the guide frame unit includes:
a damper member coupled to be engaged with the lifting guide member, and rotating in a direction opposite to the lifting guide member to adjust a movement speed of the main body when the main body slides and moves along the guide rail.

13. The handle device for embarking or disembarking the vehicle of claim 1, wherein the handle unit includes:
a pair of connection members disposed inside the cover unit; and
a grip member connecting the connection members to each other, and protruding to the bottom of the mounting plate to be selectively gripped.

14. The handle device for embarking or disembarking the vehicle of claim 13, wherein the grip member includes:
an LED light source installed in a mounting region provided therein, and emitting light; and
a transmissive lens configured to transmit the light emitted by the LED light source to be exposed to the outside.

15. The handle device for embarking or disembarking the vehicle of claim 14, wherein the LED light source is formed as any one of a lighting lamp having different colors or an UV germicidal lamp.

* * * * *